United States Patent [19]

Wassell

[11] Patent Number: 5,090,167
[45] Date of Patent: Feb. 25, 1992

[54] SOLAR SHED

[76] Inventor: Stephen Wassell, 8542 Mt. Vernon Hwy., Alexandria, Va. 22309

[21] Appl. No.: 655,633

[22] Filed: Feb. 14, 1991

Related U.S. Application Data

[63] Continuation-in-part of Ser. No. 410,548, Sep. 21, 1989, abandoned.

[51] Int. Cl.$^5$ .................... E04D 13/18; E04H 14/00
[52] U.S. Cl. .................................. 52/173 R; 136/291
[58] Field of Search .............. 136/291, 293; 52/173 R

[56] References Cited

U.S. PATENT DOCUMENTS

| | | | |
|---|---|---|---|
| 4,009,051 | 2/1977 | Kazis et al. | 320/15 |
| 4,080,221 | 3/1978 | Manelas | 136/248 |
| 4,275,525 | 6/1981 | Geisler et al. | 46/39 |
| 4,827,534 | 5/1989 | Haugen | 2/108 |

FOREIGN PATENT DOCUMENTS

| | | | |
|---|---|---|---|
| 61-240685 | 10/1986 | Japan | 136/291 |
| WO89/02055 | 3/1989 | World Int. Prop. O. | 136/291 |

*Primary Examiner*—Aaron Weisstuch

[57] ABSTRACT

A solar shed is disclosed comprising a secure shelter for battery-powered electric tools, such as lawnmowers, trimmers, and leaf blowers, and further comprising photovoltaic cells built into the sloped roof of the solar shed. The electricity generated by the photovoltaic cells is routed to the batteries of the electric tools in the interior, so that the batteries are recharged for later use. The solar shed is marketed in prefabricated components, having a square floor plan so that the walls and the roof can be oriented in any of four directions with respect to each other, in particular, so that the slope of the roof can be oriented to face a generally southward direction, regardless of where the user wishes to locate the shed on the site. This will allow for adequate exposure of the photovoltaic cells to sunlight. The increase in height in the interior of the solar shed resulting from the sloped roof allows the walls to be shorter and therefore more manageable for easier assembly. Taller users can locate the door so that, upon entering the solar shed, the user has more headroom resulting from the sloped ceiling. In addition, the solar shed has its own battery-powered features, such as lighting, which are recharged by the same photovoltaic cells.

4 Claims, 1 Drawing Sheet

SOLAR SHED

This application is a continuation-in-part of application Ser. No. 410,548 filed Sept. 21, 1989, and now abandoned.

BACKGROUND OF THE INVENTION

1. Field of the Invention

This invention generally relates to devices which utilize photovoltaically generated electricity to recharge batteries, the batteries being either an internal part of the device or externally used to run some other device. In particular, this invention relates to a shed whose roof is equipped with photovoltaic cells which generate electricity in order to recharge the batteries of the electric tools stored in the interior of the shed.

2. Description of the Prior Art

Gasoline has proven to be an extremely convenient source of energy for the powering of lawn tools (e.g., lawnmowers, trimmers, leaf blowers, etc.). Unfortunately, the consequent widespread use of such gasoline-powered tools has become an environmental problem in many areas. In fact, the South Coast Air Quality Management District, a governmental organization including representatives from both Los Angeles County and California State governments, has been analyzing exactly this problem, among others, in an effort to provide real solutions to combat the smog problems in southern California. It has become apparent that, in the near future, power tools must be designed to be less polluting than they are at present. Indeed, the Air Quality Management Plan (March 1989) for the South Cost Air Basin includes a proposal for the electrification of various power tools in the future.

Many electric lawn tools are marketed at present, e.g., lawnmowers and trimmers. However, the extension cord necessary to supply the electricity to such tools is inconvenient. In order to solve this problem in the case of lawnmowers, rechargeable electric lawnmowers have been disclosed in the prior art, an example being U.S. Pat. No. 3,212,244. However, problems remain with electric tools whose batteries are recharged with Standard AC current. Namely, the user of the tools must pay for the electricity used, and the production of said electricity results in air pollution at the utility where the electricity is generated.

In order to solve these problems in the case of lawnmowers, a solar powered lawnmowers has been disclosed in the prior art (U.S. Pat. No. 4,942,723). However, the problem remains that, regardless of the source of the electricity for recharging the batteries, rechargeable electric lawnmowers only work for about half an hour per charge, a factor which prohibits many consumers from considering the purchase of such lawnmowers. Furthermore, the present inventor has not found other solar powered lawn tools disclosed in the prior art. The closest example in the prior art is a solar powered drill (Carrying case for self powered electric drill, Fed. Rep. Germany Patent No. 3,314,251), whose battery pack is recharged by photovoltaic cells on the exterior of its carrying case.

The prior art includes a patent entitled Solar Cell Electric and Heating System (Manelas, U.S. Pat. No. 4,080,221). Manelas claims a system comprising solar cells with "truncated conical reflectors" residing above said cells to concentrate the sun's rays, which is to be used on the roof of a residence to provide heat and electricity for the occupants. However, Manelas does not anticipate any of the opportunities which particularly allow solar power to be used more effectively with lawn tools rather than with the household products of Manelas, such opportunities being described further below in respect to the present invention. The present invention exploits these opportunities by adapting the conventional design of a shed in ways nonobvious to those skilled in the prior art.

Therefore, it is an object of the present invention to provide a solar shed which is equipped with photovoltaic cells on its sloped roof to be used to recharge batteries for electric tools which are safely and conveniently stored in its interior.

A further object of the present invention is to provide a solar shed which is marketed in such prefabricated components as to allow for certain variations in installation so that each user is able to customize the design to adapt to his own needs.

A further object of the present invention is to provide a solar shed whose floor plan and section are designed to allow for flexibility of installation so that the user can locate the shed wherever he pleases and still maintain an adequate amount of exposure of the photovataic cells to sunlight.

A further object of the present invention is to provide a solar shed which comprises its own battery-powered features, such as lighting, which are recharged by the same photovoltaic cells.

These and other objects will become apparent upon examination of the Summary of the Invention and the Description of the Preferred Embodiment in view of the drawings.

SUMMARY OF THE INVENTION

The solar shed according to the present invention photovoltaically recharges batteries for the lawn tools which are securely stored in its interior. Said recharging occurs during the natural resting periods inherent in the use of lawn tools (most typically, during the weekdays while the owner is working elsewhere). During the daylight hours of said resting periods, the photovoltaic cells, which are placed on the sloped roof of the solar shed, generate electricity which recharges the batteries for the electric tools stored in the interior of the solar shed. Spare batteries, which are securely stored in the interior of the solar shed, are also recharged by the same photovoltaic cells. This will allow for the user of the shed to suit the electrical storage capacity of the solar shed to his needs; the user may purchase, and charge by means of the present invention, as many spare batteries as are needed to accomplish all of the lawn care jobs that are desired to be performed without having to wait for the batteries to be recharged.

The solar shed is marketed in the form of prefabricated components, attention being paid to both ease and flexibility of installation. In particular, the floor plan and section of the solar shed are designed to allow the user to orient the slope of the roof in a generally southward direction regardless of where the user wishes to locate the shed and regardless of where the user wishes to locate the door on the shed. Furthermore, the extra headroom created by the slope of the roof is exploited to allow for the walls to be a manageable height for easier installation. These aspects of the design will be described in more detail below.

The present invention solves the problems associated with gasoline powered lawn tools, electric lawn tools that require the use of an extension cord while in operation, and rechargeable battery-powered electric lawn tools disclosed in the prior art. The lawn tools stored in the solar shed are powered with electricity generated by photovoltaic cells. Thus, the use of the solar shed causes no air pollution to be generated, neither by the user nor by the utility which serves the user. In addition, no energy costs are incurred by the user in order to provide energy for the lawn tools recharged by the solar shed, and there is no need for the use of an extension cord. The user of the solar shed can suit the electrical storage capacity of the solar shed to his own needs; this is not the case with rechargeable electric tools disclosed in the prior art. Finally, the present invention has been designed specifically for the recharging of lawn tools in an effective, marketable way, unlike the more expensive and less marketable photovoltaic systems disclosed in the prior art.

BRIEF DESCRIPTION OF THE DRAWINGS

The solar shed according to the present invention is illustrated in the accompanying drawing in which.

While the invention will be described in connection with the presently preferred embodiment, it will be understood that it is not intended to limit the invention to this embodiment. On the contrary, it is intended to cover all alternatives, modifications, and equivalents as may be included in the spirit of the invention as defined in the appended claims.

DESCRIPTION OF THE PREFERRED EMBODIMENT

Figure 1:
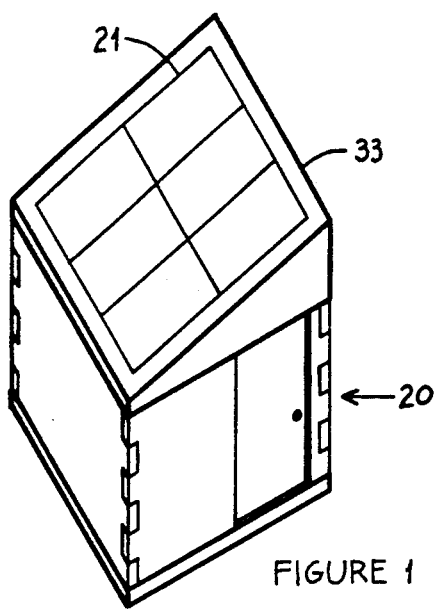
FIG. 1 is a perspective view of the solar shed.

As shown in FIG. 1, the solar shed according to the present invention is a secure shelter 20 for electric lawn tools and the like which is equipped with photovoltaic cells 21 on its pent roof 33, a pent roof being a roof which slopes in only one direction.

Figure 2:
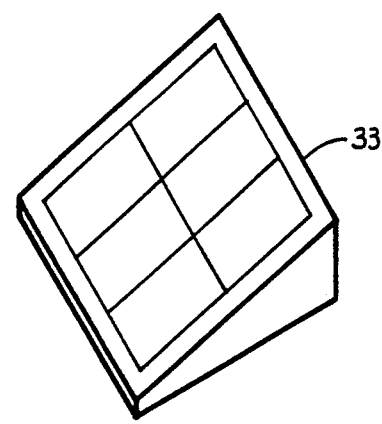
FIG. 2 is a schematic showing the electrical configuration of the invention.
Figure 2:
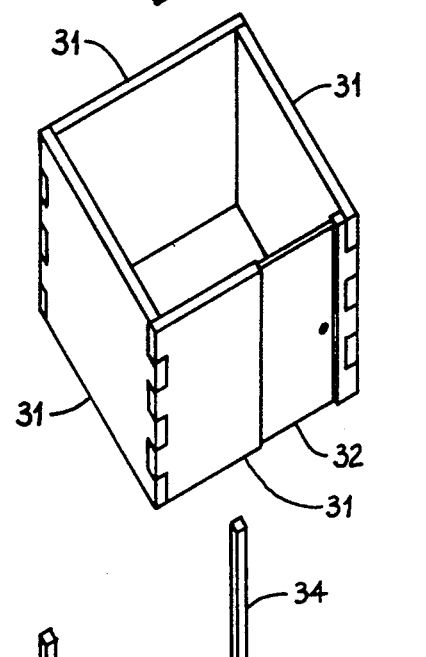
Figure 2:
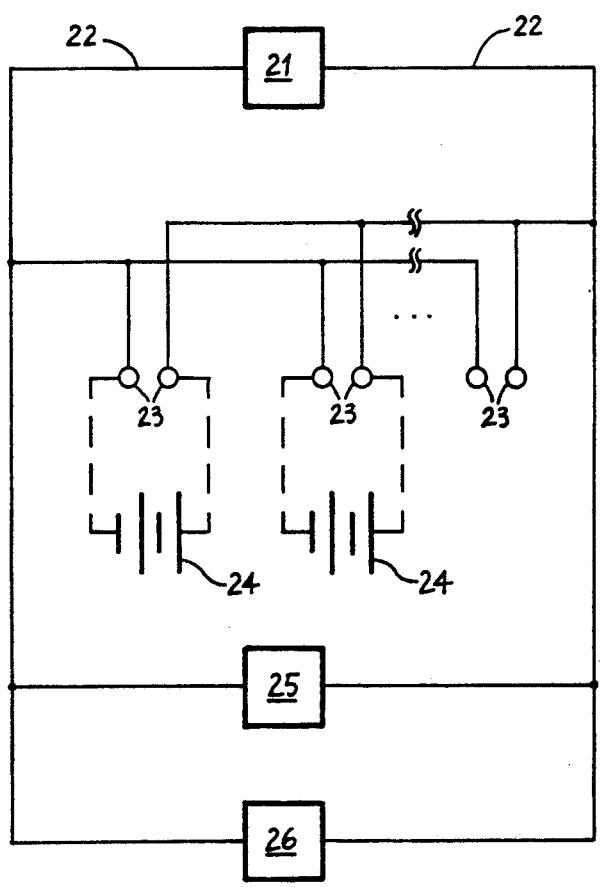

As shown in FIG. 2, the electricity generated by the photovoltaic cells 21 is wired 22 to outlets 23 in the interior of the solar shed to which the batteries 24 for the electrical tools stored in the solar shed can be electrically connected so that said batteries are recharged. It is a particular advantage of the present invention that spare batteries, as well, may be conveniently stored on shelves inside the solar shed while at the same time being recharged by the photovoltaic cells. In addition, the solar shed according to the present invention is equipped with its own internal photovoltaically-recharged battery-powered features such as lighting 25 and ventilation 26.

It is natural to market the solar shed in the form of prefabricated components, including floor 30, walls 31, door 32, roof 33, and structural elements 34, to allow for mass production and marketability. The above components may be themselves made up of various prefabricated parts (e.g., by "roof" it is meant the roof assembly including the photovoltaic cells). The user must be able to assemble and install the solar shed where he so desires while still allowing for adequate solar exposure to the photovoltaic cells on the pent roof. Thus, the user cannot be constrained by the location of the door on the shed, nor can he be constrained by any particulars of the site (lay of the land, compass direction, etc.). In other words, the orientation of the photovoltaic cells on the roof must be independent of both the placement of the solar shed on the site and of the placement of the door on the solar shed.

Figure 3:
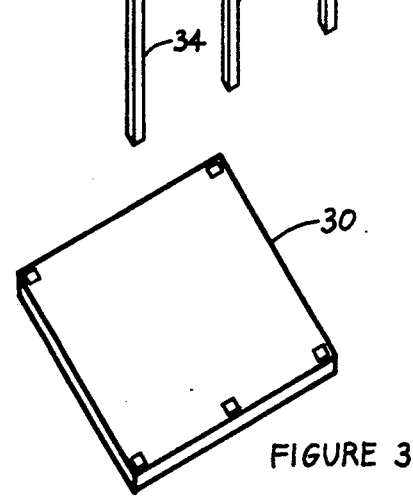
FIG. 3 is an exploded view showing the floor, walls, door, roof, and structural elements of the solar shed.

Accordingly, as shown in FIG. 3, the floor 30 of the solar shed is square in shape so that the roof 33 will fit on the walls in any of four positions. Of these four possibilities, the user will choose that which orients the slope of the roof so that the photovoltaic cells 21 are approximately perpendicular to the rays of the sun from the southern portion of the sky. The door 32 of the solar shed and its frame occupy one half of one of the four walls. Thus, the door of the shed can be placed in any of eight positions (two possibilities on each of the four walls). The prefabricated components are designed so that this is possible.

Taller users can locate the door in one of the four positions where the peak of the roof allows more headroom inside the shed. In other words, once the slope of the roof is oriented to face the southern direction, the taller user can locate the door in one of two positions on the northern wall, or on the northern half of the eastern wall, or on the northern half of the western wall. This allows for more headroom directly inside the door. As such, the prefabricated walls can be made shorter for easier assembly. The range in height inside the shed is approximately 6 feet to approximately 8 feet, allowing virtually all users to stand up inside at least part of the shed.

FIG. 3 shows a simplified version of a preferred embodiment of the present invention in order to illustrate only that which is being claimed. For example, the walls 31 could have a more detailed cross section, the structural elements 34 could be circular in cross section, and there may be structural elements at the midpoints of all four walls (not just on the wall abutting the door 32). Such details of construction need not be specified in order to clearly define that which is being claimed. That which is being claimed is the novel combination of the square floor plan, the pent roof, and the adjustable placement of the door; said combination ensures that the photovoltaic cells receive near maximal solar exposure regardless of where the user wishes to position the shed on the land and regardless of where the user wishes to position the door on the shed.

The materials and construction employed in the manufacturing and assembly of the solar shed may include many common materials and methods or combinations thereof. There are two reasons for this. Accordingly, a variety of materials can be used for the various components, including, but not limited to, wood, metal, and structural plastic. Similarly, the electrical schematics in FIG. 2 are purposely kept simple. Switches, resistors, and the like have not been included because their inclusion would not help in defining that which is being claimed as novel. As such, it will be understood that the materials and methods of construction employed in the manufacturing and assembly of the solar shed, as well as the electrical configuration of the shed, may include more items than shown in the illustrations without departing from the scope of the invention. Therefore, the invention is not to be restricted except insofar as is necessitated by the following claims and all equivalents thereof.

The invention claimed is:

1. A solar shed comprising a secure shelter having walls and a door through one of the walls and a pent roof, and further comprising photovoltaic cells on the pent roof of the shelter and electrical connections which extend from the cells to outlets in the interior of the shelter, for the purpose of photovoltaically recharging batteries for electric tools stored in the interior of the shelter, said shelter being assembled from prefabricated components, having a square floor plan so that the walls and the roof can be oriented with respect to each other in any of four directions, in particular, so that the slope of the roof can be oriented to allow for adequate solar exposure to the photovoltaic cells and so that the door can be positioned to allow the user to enter the shed where there is more headroom resulting from the slope of the pent roof.

2. A solar shed according to claim 1, which further comprises its own internal photovoltaically-recharged battery-powered lighting.

3. A solar shed according to claim 2, which further comprises its own internal photovoltaically-recharged battery-powered ventilation.

4. A solar shed according to claim 1, which further comprises its own internal photovoltaically-recharged battery-powered ventilation.

* * * * *